United States Patent [19]

Weiss

[11] Patent Number: 5,799,696
[45] Date of Patent: Sep. 1, 1998

[54] SOLENOID ACTUATED TOGGLE VALVE

[75] Inventor: Andreas A. Weiss, Nashua, N.H.

[73] Assignee: Parker-Hannifin Corporation, Cleveland, Ohio

[21] Appl. No.: 709,802

[22] Filed: Sep. 10, 1996

Related U.S. Application Data

[60] Provisional application No. 60/005,547 Oct. 18, 1995.

[51] Int. Cl.$^6$ .......................... F16K 11/052; F16K 31/06
[52] U.S. Cl. .................. 137/625.44; 137/625.65; 251/129.2
[58] Field of Search .................. 137/625.44, 625.65; 251/129.2

[56] References Cited

U.S. PATENT DOCUMENTS

| | | | |
|---|---|---|---|
| 2,549,188 | 4/1951 | Forsnas | 251/30.02 |
| 2,570,450 | 10/1951 | Hottenroth | 251/129.2 |
| 2,912,012 | 11/1959 | Klingler . | |
| 2,961,002 | 11/1960 | Gordon . | |
| 3,238,398 | 3/1966 | Trbovich et al. . | |
| 3,415,283 | 12/1968 | Trbovich et al. . | |
| 3,523,121 | 8/1970 | Sturman et al. . | |
| 3,683,962 | 8/1972 | Good | 251/129.2 X |
| 4,074,701 | 2/1978 | Kemmler . | |
| 4,268,009 | 5/1981 | Allen | 251/129.2 |
| 4,285,497 | 8/1981 | Guttel . | |
| 4,344,603 | 8/1982 | Hozumi et al. | 137/625.65 X |
| 4,516,604 | 5/1985 | Taplin . | |
| 4,516,605 | 5/1985 | Taplin | 137/516.16 X |
| 4,527,590 | 7/1985 | Kolze | 137/870 X |
| 4,540,020 | 9/1985 | Taplin . | |
| 4,574,841 | 3/1986 | Hugler . | |
| 4,765,370 | 8/1988 | Ariizumi et al. . | |
| 4,986,308 | 1/1991 | Champseaux . | |
| 5,027,857 | 7/1991 | Champseix . | |
| 5,090,441 | 2/1992 | Richmond | 137/870 X |
| 5,199,462 | 4/1993 | Baker . | |

FOREIGN PATENT DOCUMENTS 1 500 185  12/1969  Germany .

*Primary Examiner*—Gerald A. Michalsky
*Attorney, Agent, or Firm*—Christopher H. Hunter

[57] ABSTRACT

A solenoid-actuated toggle valve includes a valve housing enclosing a solenoid, a valve arm and a seal element. The solenoid includes an armature movable in the axial direction in an armature chamber. The valve arm has one end in the armature chamber which is connected to the armature in such a manner that the valve arm moves in the axial direction with respect to the armature, as well as in a direction perpendicular to the axial direction. Preferably, the connection comprises an elongated slot which is received around a narrow portion at the end of the armature. The valve arm extends through an opening in the housing to a valve chamber. The valve arm has a pivot axis at the opening which is perpendicular to the axial direction of the armature. The seal surrounds the opening to the valve chamber around the valve arm and has a sleeve which is received over the free end of the valve arm. When the valve arm pivots, the sleeve has surfaces which seal flush against the opening to inlet and outlet passages into the valve chamber.

7 Claims, 3 Drawing Sheets

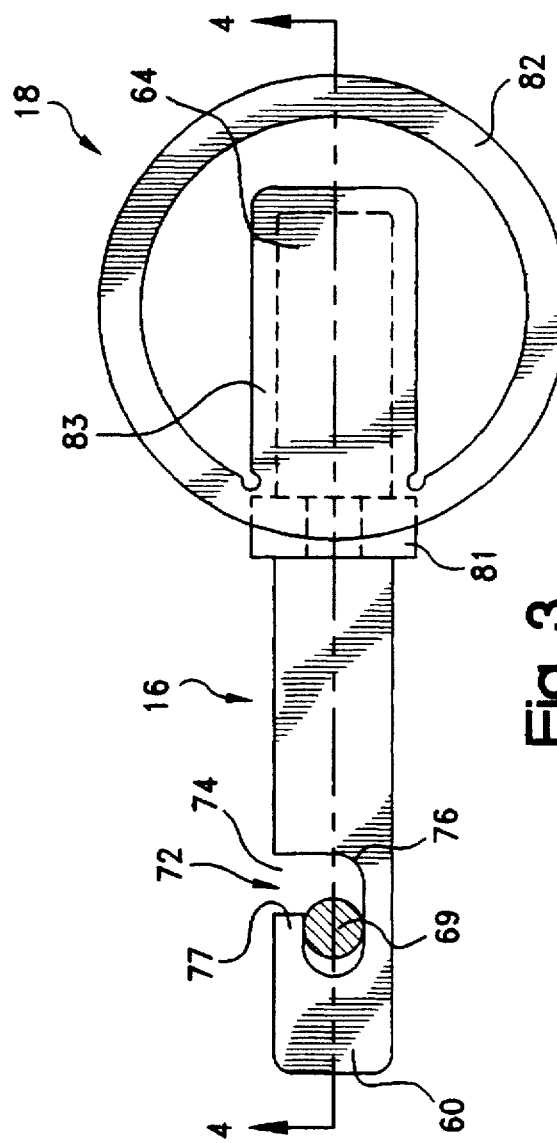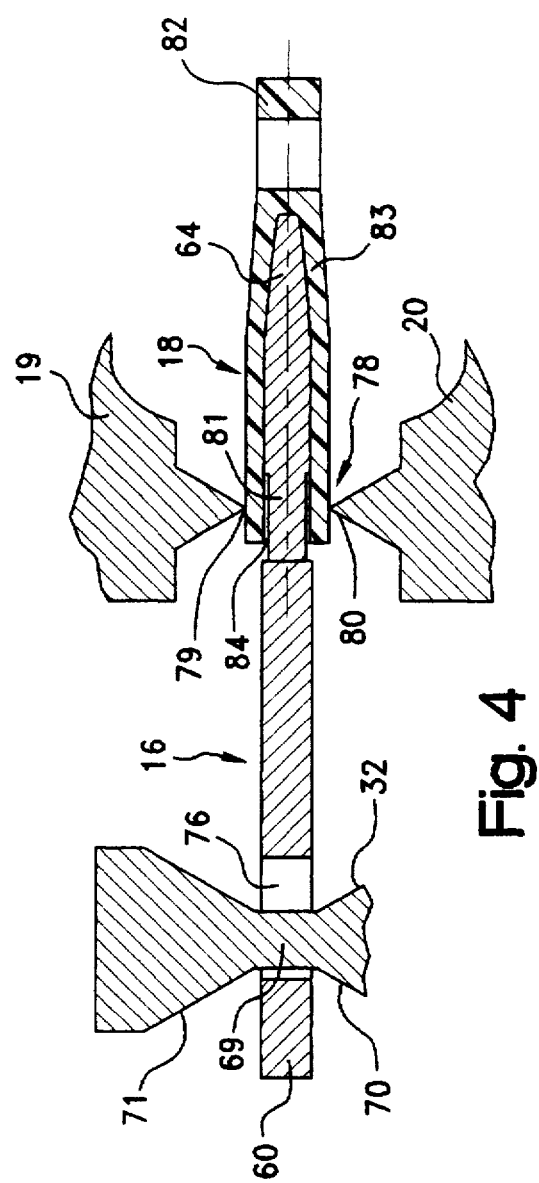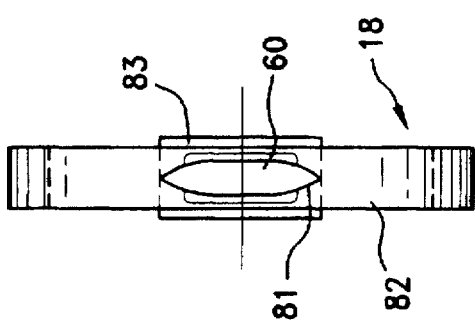

SOLENOID ACTUATED TOGGLE VALVE

This application claims the benefit of U.S. Provisional application No. 60/005,547 filed Oct. 18, 1995.

FIELD OF THE INVENTION

The present invention relates generally to directional control valves, and more particularly, to a solenoid-actuated toggle valve.

BACKGROUND OF THE INVENTION

Directional control valves are well-know types of valves which are used to control the flow of fluid in a variety of applications. Typical directional control valves have either a two or three-port design, with one open inlet port and one or two outlet ports which can be selectively connected to the inlet port, or one or two inlet ports and one open outlet port to which the inlet port(s) can be selectively connected. Devices for controlling the fluid flow through the ports include electromagnet or solenoid control of a membrane or diaphragm such as shown in U.S. Pat. Nos. 5,199,462, 4,986,308, and 5,027,857. The use of a membrane or diaphragm in a directional control valve, however, can cause pivot distortions during armature movement because of the connection of the membrane or diaphragm to the surrounding housing. These devices can also be complex and expensive to manufacture. Another device to control the flow of fluid is shown in U.S. Pat. No. 4,765,370. In this patent, a directional control valve has a valve housing with a sealed valve chamber, an elastic seal member which is located in the valve housing to seal the valve chamber, and a valve arm which is pivotally held by the seal member. The valve arm is disclosed as being connected at one end to the armature of a solenoid and having one or two valve bodies integral therewith at the other end. The valve arm has a connecting hole at the first end which receives a plunger of the armature and is disposed between a retainer connected to the solenoid plunger, and a retainer spring. The valve chamber has three valve ports, one of which is permanently open and the remaining two of which are selectively opened and closed by the valve body or bodies.

The device illustrated in U.S. Pat. No. 4,765,370 can still have undesirable force imbalances as the valve moves from one operating position to another. This is because the armature moves in a purely axial manner, while the valve arm attempts to follow an arc centered around its pivot point. The force imbalances can cause the seal to function inconsistently. Specifically, the imbalance on the valve arm can cause the seal to contact the port openings at different locations during operation of the valve, which can cause loading of the seal and uneven wear. As such, it is believed that there is a demand in the industry for a directional control valve, and more specifically a solenoid-actuated toggle valve, which addresses these concerns.

SUMMARY OF THE INVENTION

The present invention provides a solenoid-actuated toggle valve which provides consistent, repeatable results and is simple in design and operation. Force imbalances created by the armature movement are compensated for by a unique connection between the toggle or valve arm and the armature, while the seal on the valve arm has a unique geometry which seals flush against the openings to the respective ports. As such, the toggle valve can be used for applications where consistent and repeatable operation of the valve is required.

According to the principles of the present invention, the valve arm has an elongated slot at one end which is located at a narrow section of the armature. The slot has an opening along one side of the valve arm which enables the valve arm to be easily located on the armature. The valve arm moves axially in conjunction with the movement of the armature, and can also slide in a direction perpendicular to this axial direction by virtue of the elongated slot. The sliding of the valve arm in relation to the armature compensates for the force imbalances created by the armature.

The valve arm is also connected at the pivot point about its midsection to the housing for the valve, and extends into a valve chamber. A seal is disposed in the valve chamber and includes an outer annular frame which seals around the valve arm in the opening to the valve chamber. The seal also includes a sleeve which receives the other, free end of the valve arm. The sleeve has a pair of opposed surfaces for sealing the opening of the ports into the valve chamber. The sealing surfaces are inwardly tapered toward the free end of the valve arm such that as the valve arm is pivoted about its pivot point, the sealing surfaces are aligned flush with the openings to the ports.

As such, the unique connection between the valve arm and the armature prevents force imbalances caused by the armature from being applied to the sealing surfaces, which thereby reduces wear on the seal, and provides consistent and repeatable operation of the valve. Other features and advantages of the present invention will become further apparent upon reviewing the following specification and attached drawings.

BRIEF DESCRIPTION OF THE DRAWINGS

FIG. 3 is a top plan view of the seal and valve arm assembly, illustrating the connection of the valve arm assembly to the armature;

FIG. 4 is a cross-sectional side view of the seal and valve arm taken substantially along the plane described by the lines 4—4 of FIG. 3, also illustrating the valve arm positioned within the opening between the valve chamber and the armature chamber; and FIG. 5 is an end view of the seal and valve arm of FIG. 3.

DETAILED DESCRIPTION OF THE PREFERRED EMBODIMENT

Figure 1:
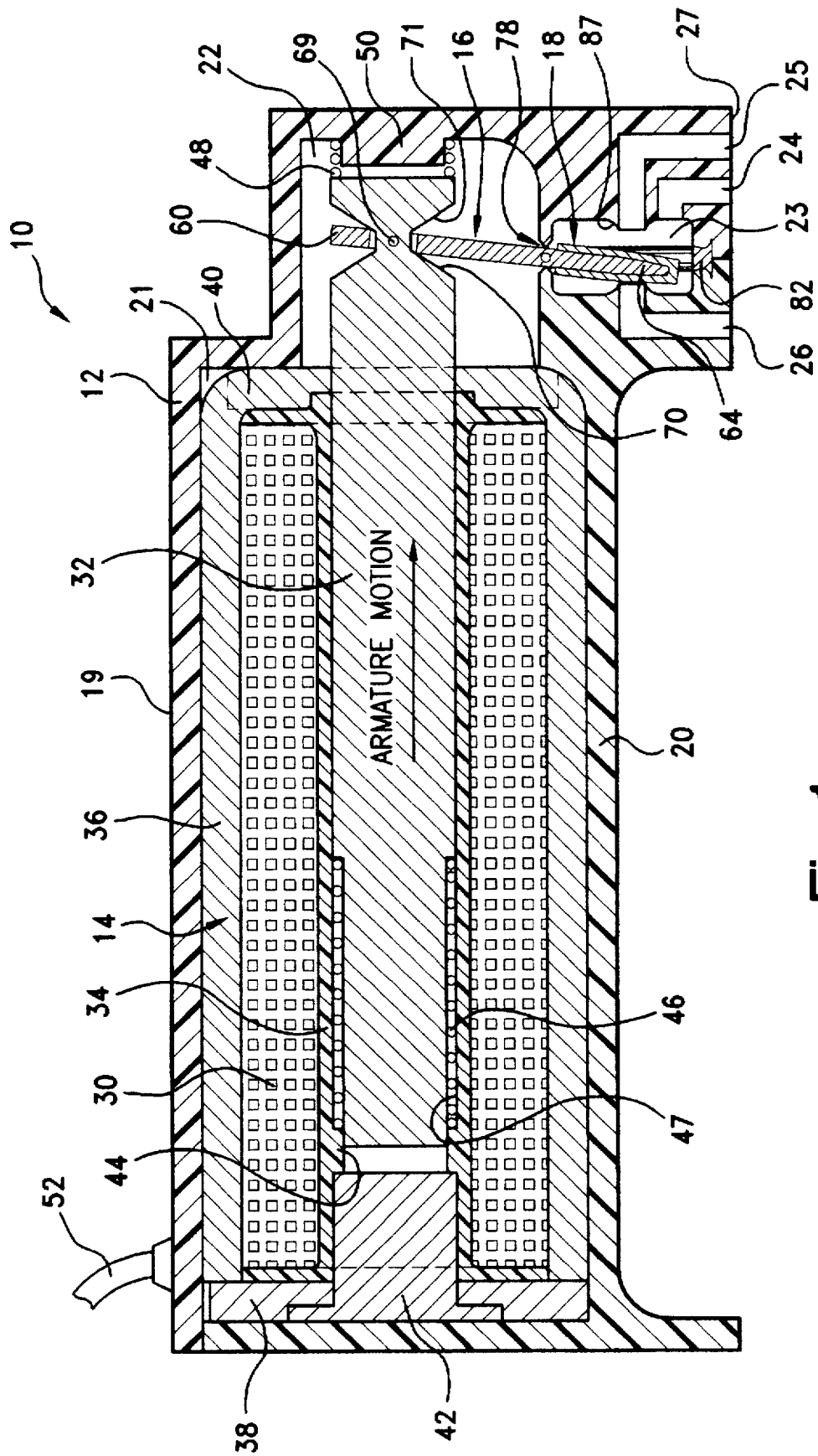
FIG. 1 is a cross-sectional side view of a solenoid-actuated toggle valve constructed according to the present invention, illustrating the valve in its deenergized position.

Referring to the drawings, and initially to FIG. 1, a solenoid-actuated toggle valve constructed according to the principles of the present invention is indicated generally at 10. The valve 10 includes a housing 12 enclosing a solenoid, indicated generally at 14, a toggle or valve arm, indicated generally at 16, and a seal element, indicated generally at 18. Housing 12 is preferably of a two-piece, rectangular box-shape design, with an upper housing portion 19 and a lower housing portion 20. The upper and lower housing portions together define a chamber 21 for solenoid 14, an armature chamber 22 at one end of solenoid 14, and a valve or distribution chamber 23 adjacent the armature chamber. The upper and lower housing portions are preferably formed from stainless steel using conventional metal forming techniques, e.g., stamping or die-casting. Plastic formed members can also be used.

The toggle valve 10 is designed for mounting to a manifold, and to this end includes a plurality of ports, for example a normally open port 24 and a pair of selectively-operable ports 25, 26 along one flat end 27 of the valve. Ports 24, 25 and 26 can be inlet or outlet ports, depending upon the particular fluid flow requirements, and open into internal valve or distribution chamber 23.

Figure 2:
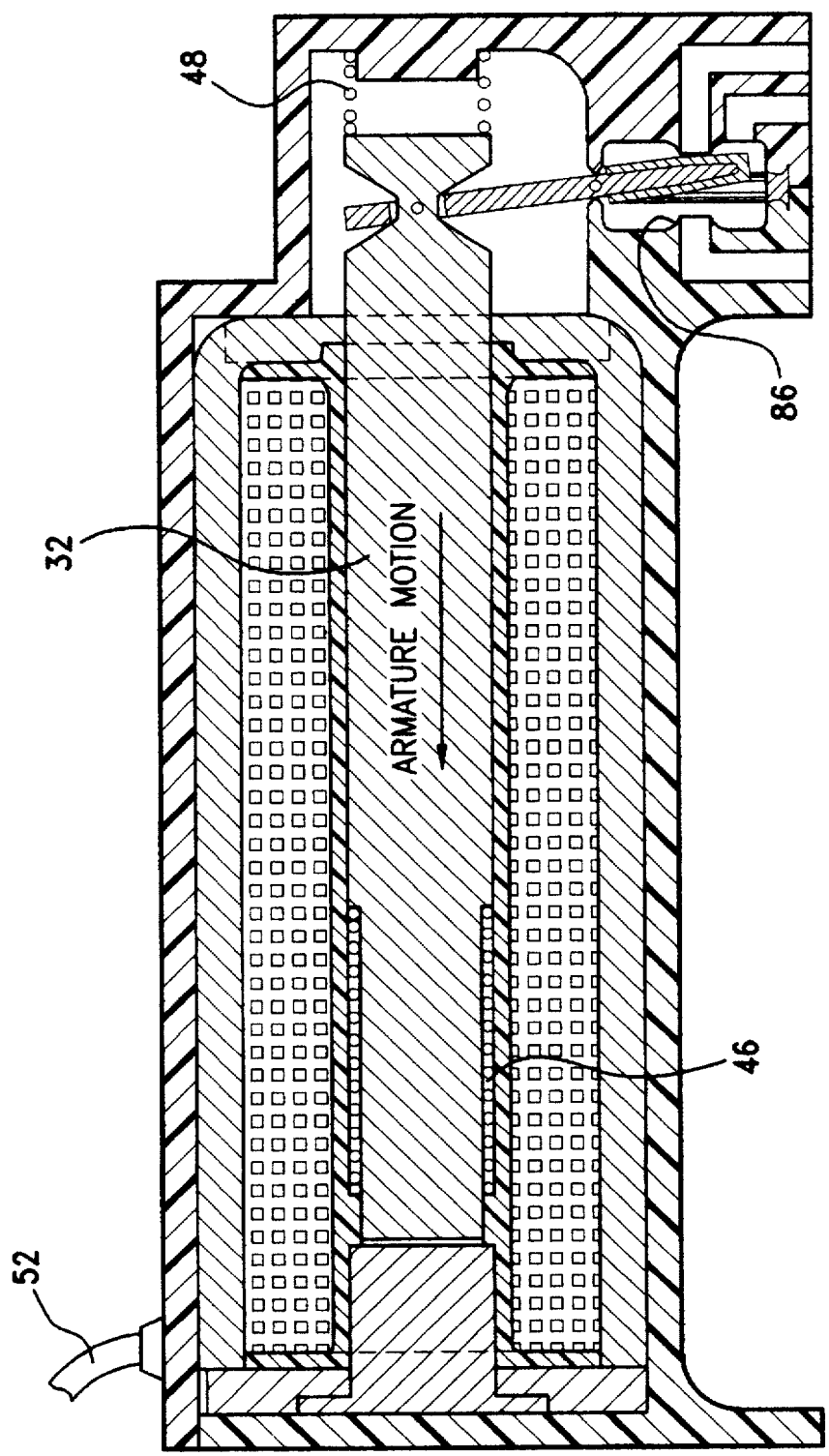
FIG. 2 is a cross-sectional side view of the valve of FIG. 1, illustrating the valve in its energized position.

Solenoid 14 of valve 10 is preferably a conventional solenoid and includes a solenoid coil 30 surrounding a cylindrical armature or plunger 32. Coil 30 has an appropriate number of windings which are wound around a hollow bobbin 34 and enclosed within a housing assembly consisting of a cylindrical outer shell 36 and annular end caps 38, 40. An end plug 42 closes end cap 38 at one end of the solenoid, while the armature extends through a circular opening formed in the other end cap 40 into armature chamber 23. A minimum air gap for flux purposes is provided between armature 32 and end plug 42 by an inwardly-projecting annular segment 44 in bobbin 34. The armature 32, bobbin 34, end plug 42 and outer shell 36 are made from ferromagnetic materials. A compression spring 46 is received within a counterbore 47 formed in the hollow cavity of bobbin 34 and biases the armature outwardly from the solenoid. A corresponding compression spring 48 is received in armature chamber 23 around an annular flange 50 of housing 12 and biases the armature in the opposite direction from the bias of spring 46, that is, back into solenoid 14. As such, armature 32 is normally balanced between springs 46 and 48. When coil 30 is energized by a voltage applied through electrical connectors 52, armature 32 is moved outwardly from the solenoid against the bias of spring 48, as shown in FIG. 2. When the solenoid is deenergized, spring 48 returns the armature to its normal balanced position, shown in FIG. 1.

Referring now to FIGS. 1, 3 and 4, valve arm 16 preferably has an elongated flat design with a first end 60 which is connected to armature 32 in armature chamber 22, and a second end 64 which is received within seal 18 in valve chamber 23. To connect valve arm 16 to armature 32, the distal end of armature 32 includes a cylindrical (in cross-section) central member 69, which is substantially thinner than the rest of the armature. Frusto-conically tapered surfaces 70, 71 extend outwardly from either end of central member 69. The central member 69 extends axially along the armature and serves as a connection point for the valve arm. To this end, valve arm 16 includes an axially-elongated slot, indicated generally at 72 in FIG. 4, which receives the central member 69 of the armature. Slot 72 includes a transverse cut 74 along the side edge toward end 60 which initially receives the central member 69, and an axial cut 76 which forms a "hook" 77 to retain central member 69 in slot 72. The axial length of cut 76 is preferably greater than the maximum cross-section of the central member 69, such that the arm can move freely in the axial direction of the valve arm—that is, perpendicular to the geometric axis of the armature. However, valve arm 16 is supported between tapered surfaces 70, 71 relative to the armature such that the plane of the valve arm is maintained substantially perpendicular to the axis of the armature.

Valve arm 16 is also pivotally connected to housing 12. To this end, housing 12 includes a slot, indicated generally at 78, which is formed by opposing housing lips 79, 80 (FIG. 4) on housing portions 19, 20, and extends between armature chamber 22 and valve chamber 23. Valve arm 16 includes a flange 81 which projects outwardly from the sides of valve arm 16 near the midpoint of the arm and in the plane of the valve arm. As can be seen from FIG. 4, flange 81 is thinner than the rest of the valve arm and is received within slot 78. The flange 81 pivots about lips 79, 80 and provides space for a seal between the two cavities, as will be described herein in more detail. Valve arm 16 can pivot freely on the lips of slot 78 along a pivot axis perpendicular to the axial direction of the armature. Slot 78 also aligns the plane of the pivot arm perpendicular to the axial direction of the armature.

Referring now to FIGS. 3, 4 and 5, the seal element 18 for the valve preferably includes a flat outer frame 82 surrounding an inner pocket 83. Preferably, seal element 18 is formed in one piece from elastomeric material, using techniques which should be well known to those of ordinary skill in the art. Outer frame 82 preferably has an annular configuration, however, the frame can have other configurations, such as square or rectangular, depending upon the particular application for the valve. Pocket 83 is preferably formed in one piece with one side of frame 82 and extends diametrically across a portion of the frame. Pocket 83 has an open end 84 along the edge of the frame, which opens outwardly away from the frame. The open end 84 is sized to receive the free end 64 of valve arm 16. The end 64 of the valve arm can be tapered to facilitate inserting the arm into the pocket. The outwardly-extending flange 81 is tightly received in open end 84, and as such, frictionally retains the valve arm in the seal. The remainder of the valve arm is also fairly tightly received in pocket 83. It is noted that pocket 83 is free to move with respect to frame 82, that is, the free (unattached) end of pocket 83 can pivot out of the plane of the seal about an axis defined by the connection of pocket 83 with frame 82.

Referring again to FIGS. 1 and 4, seal element 18 is disposed in valve chamber 23 with frame 82 sealing the intersection between the upper and lower housing portions 19, 20 which define valve chamber 23. Seal element 18, and in particular the portion of the frame 82 surrounding opening 84, seals valve arm 16 within slot 78. Seal 18 thereby prevents fluid from passing from valve chamber 23 to armature chamber 22.

As indicated previously, sleeve 83 can move with valve arm 16 as the arm pivots about lips 79, 80. For example, as shown in FIG. 1, when solenoid 10 is deenergized and armature 32 is moved to its closed position, valve arm 16 is pivoted about slot 78 such that sleeve 83 on the end 64 of the valve arm is pressed against the opening to port 26, thereby closing this port. When the solenoid is in its energized position, as illustrated in FIG. 2, and the armature is moved to its open position, the sleeve 83 is moved against the opening to port 25, thereby preventing fluid flow through this port. In either of the energized or deenergized positions, passage 24 remains open for fluid flow.

As the valve arm moves from its deenergized position (FIG. 1) to its energized position (FIG. 2), the valve arm pivots about the connection to armature 32 as the armature 32 moves axially. The valve arm 16 also moves in a direction perpendicular to the axial direction of the armature 32 (in a direction along the axis of arm 16) as the valve arm moves about its radius of curvature. With the valve arm moving in this manner, the arm only has a pivotal moment around lips 79, 80, with no force imbalances caused by armature 32. Sleeve 82 thereby contact ports 24 and 26 in a consistent and repeatable manner. The symmetrical nature of the seal provides for sealing the ports at the same location on either side of the valve arm. More particularly, the seal "floats" to a proper sealing position against these ports.

To further facilitate providing a proper seal to the passages, sleeve 82 can have a tapered shape toward the free end of this sleeve, that is, toward the end 64 of the valve arm. Each port can also have a circumferential lip around the opening to the port to further improve the sealing characteristics. For example, port 26 can have circumferential lip 86, (FIG. 2) at its inside opening, while port 25 can have circumferential lip 97 (FIG. 1) at its inside opening. Thus, when the valve arm 16 moves against one of the other of ports 24 or 26, sleeve 82 has a flush seal against the opening to a respective port.

Thus, as described above, the solenoid-actuated toggle valve of the present invention is simple in design and operation and provides consistent, repeatable results.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A solenoid actuated toggle valve, comprising:

a valve housing enclosing a solenoid in a first chamber, a seal ring in a second chamber, and a valve arm extending trough an opening between said first and second chambers, said second chamber including a pair of opposed sidewalls, a first passage opening into one of said sidewalls, and at least one other passage opening into the other of said sidewalls, said solenoid having an armature moveable in the axial direction of said solenoid in the first chamber in said housing, said valve arm having a pivotal connection in said housing between said first and second chambers which allows said valve arm to pivot about an axis perpendicular to said axial movement of said armature, said valve arm also having a connection means at one end in said first chamber to said armature for allowing i) movement of said valve arm in conjunction with the axial movement of said armature, and ii) movement of said valve arm relative to said armature in a direction perpendicular to the axial direction of said armature, said connection means comprising a slot which is longer than it is wide extending axially along the valve arm and a transverse cut in said valve arm connecting with said axial slot and defining an opening along a side edge of the valve arm, said armature having a tapered-down portion which can be received through said cut and located in said slot and bear against said valve arm to move said valve arm in the axial direction of said armature, said tapered down portion of said armature sliding lengthwise in said slot in a direction perpendicular to the axial direction as said armature moves in the axial direction to prevent axial displacement of said valve arm with respect to said pivot point during movement of said armature, said seal ring being received on another end of said valve arm, said seal ring having an outer frame defining a central cavity and an integral sleeve in said cavity surrounded by said frame, said frame providing a seal around said valve arm in said opening between said first and second chambers, said sleeve receiving said valve arm and providing a first sealing surface on a first side of said valve arm for sealing against said first passage, and a second sealing surface on a second side of said valve arm for sealing against another of said passages, said valve arm pivoting about its pivot axis as said armature moves axially within said first chamber when said solenoid is energized or deenergized such that said first or second sealing surfaces seal flush against the opening to a respective passage into said second chamber.

2. The solenoid actuated toggle valve as in claim 1, wherein said surfaces of said seal sleeve are inwardly tapered toward the free end of said sleeve such that said first and second surfaces of said sleeve are flush with a respective opening as the valve arm is pivoted about its pivot point.

3. The solenoid actuated valve arm as in claim 2, wherein said valve arm and housing have cooperating structure which maintains said valve arm within said opening between said first and second chambers.

4. The solenoid actuated toggle valve as in claim 3, wherein said cooperating structure includes a thin flange extending outwardly from side edges of the valve arm in a plane common to a plane of the valve arm, said flange being received within and pivoting about said opening between said first and second chambers.

5. The solenoid actuated toggle valve as in claim 1, wherein said connecting means further includes a hook defined in said valve arm by said axial slot and said transverse cut to retain said tapered-down portion of said armature in said axial slot.

6. The solenoid actuated toggle valve as in claim 1, wherein said armature includes a pair of frusto-conically tapered surfaces surrounding a central member and tapering downwardly toward said central member, said valve arm being located intermediate said frusto-conically tapered surfaces such that said axial slot receives said central member.

7. A solenoid actuated toggle valve, comprising:

a valve housing enclosing a solenoid in a first chamber, a seal ring in a second chamber, and a valve arm extending through an opening between said first and second chambers, said second chamber including a pair of opposed sidewalls, a first passage opening into one of said sidewalls, and at least one other passage opening into the other of said sidewalls, said solenoid having an armature moveable in the axial direction of said solenoid in the first chamber in said housing, said valve arm having a pivotal connection in said housing between said first and second chambers which allows said valve arm to pivot about an axis perpendicular to said axial movement of said armature, said valve arm also having an axially-extending slot at one end in said first chamber for connection to said armature for allowing i) movement of said valve arm in conjunction with the axial movement of said armature, and ii) movement of said valve arm relative to said armature in a direction perpendicular to the axial direction of said armature, said slot being longer than it is wide and having a transverse cut in said valve arm connecting with said axial slot and defining an opening along a side edge of the valve arm, said armature having a tapered-down portion which can be received through said cut and located in said slot and bear against said valve arm to move said valve arm in the axial direction of said armature, said tapered-down portion of said armature sliding lengthwise in said slot in a direction perpendicular to the axial direction as said armature moves in the axial direction to prevent axial displacement of said valve arm with respect to said pivot point during movement of said armature, said seal ring being received on another end of said valve arm, said seal ring having an outer frame defining a central cavity and an integral sleeve in said cavity surrounded by said frame, said frame providing a seal around said valve arm in said opening between said first and second chambers, said sleeve receiving said valve arm and providing a first sealing surface on a first side of said valve arm for sealing against said first passage, and a second sealing surface on a second side of said valve arm for sealing against another of said passages, said valve arm pivoting about its pivot axis as said armature moves axially within said first chamber when said solenoid is energized or deenergized such that said first or second sealing surfaces seal flush against the opening to a respective passage into said second chamber.

* * * * *